(12) United States Patent
Lorenzen et al.

(10) Patent No.: US 10,535,042 B2
(45) Date of Patent: *Jan. 14, 2020

(54) METHODS OF OFFERING GUIDANCE ON COMMON LANGUAGE USAGE UTILIZING A HASHING FUNCTION CONSISTING OF A HASH TRIPLET

(71) Applicant: VANAV HOLDINGS, Lake Forest, CA (US)

(72) Inventors: David T. Lorenzen, Foothill Ranch, CA (US); Nicholas J. Witchey, Laguna Hills, CA (US)

(73) Assignee: VANAV HOLDINGS, Irvine, CA (US)

( * ) Notice: Subject to any disclaimer, the term of this patent is extended or adjusted under 35 U.S.C. 154(b) by 1620 days.

This patent is subject to a terminal disclaimer.

(21) Appl. No.: 14/086,827

(22) Filed: Nov. 21, 2013

(65) Prior Publication Data

US 2014/0082488 A1 Mar. 20, 2014

Related U.S. Application Data

(63) Continuation of application No. 11/745,306, filed on May 7, 2007, now Pat. No. 8,706,470.

(60) Provisional application No. 60/798,956, filed on May 8, 2006.

(51) Int. Cl.
*G06Q 10/10* (2012.01)
*G06F 17/27* (2006.01)
*G10L 13/00* (2006.01)
*G06F 17/24* (2006.01)

(52) U.S. Cl.
CPC ........... *G06Q 10/107* (2013.01); *G06F 17/24* (2013.01); *G06F 17/274* (2013.01); *G06F 17/273* (2013.01); *G10L 13/00* (2013.01)

(58) Field of Classification Search
CPC ..... G06F 17/24; G06F 17/273; G06Q 10/107; G06Q 10/07; G10L 13/00
USPC .......................................................... 704/260
See application file for complete search history.

(56) References Cited

U.S. PATENT DOCUMENTS

| 4,914,590 | A | 4/1990 | Loatman |
| 5,437,036 | A * | 7/1995 | Stamps ................. G06F 17/273 719/312 |
| 5,542,090 | A | 7/1996 | Henderson et al. |
| 5,666,442 | A | 9/1997 | Wheeler |
| 5,995,920 | A | 11/1999 | Carbonell |
| 6,658,627 | B1 | 12/2003 | Gallup |
| 7,194,684 | B1 | 3/2007 | Shazeer |

(Continued)

OTHER PUBLICATIONS

Iqbal, Farkhund, et al., A Novel Approach of Mining Write-Prints for Authorship Attribution in e-mail Forensics, Digital Investigation 5; Science Direct, 2008, S42-S51, Elsevier.

*Primary Examiner* — Farzad Kazeminezhad
(74) *Attorney, Agent, or Firm* — Stetina Brunda Garred and Brucker

(57) ABSTRACT

Usages of language are analyzed in ways that are at least partially language independent. In preferred embodiments, portions of a document are hashed, and the resulting hash values are compared with each other and with those of other documents in real-time. Analyses can be used to gauge conformity of a document to one or more standards utilizing a hash triplet consisting of a hash for each document word and two involving the word and its preceding and following words, to provide suggestions to the author, and to filter email.

22 Claims, 3 Drawing Sheets

Guidance Filter Database

| | Token 210 | Frequency 220 | Portion 1 230 | ... | Portion n 240 |
|---|---|---|---|---|---|
| 221 | HASH("cat","jmp") | 0 | NULL | | NULL |
| 222 | HASH("cat","jump") | 1205 | cat | | jump |
| 223 | HASH("cat","jumps") | 1138 | cat | | jumps |
| 224 | HASH("cat","jumped") | 1187 | cat | | jumped |
| 225 | HASH("cat","jumping") | 12 | cat | | jumping |
| 226 | HASH("jumping","the") | 543 | jumping | | the |
| 227 | HASH("jumping","dog") | 324 | jumping | | dog |
| 228 | HASH("jumped","the") | 1346 | jumped | | the |
| 229 | HASH("jumped","dog") | 1187 | jumped | | dog |

(56) References Cited

U.S. PATENT DOCUMENTS

| | | |
|---|---|---|
| 7,523,314 B2 | 4/2009 | Spies |
| 7,644,127 B2 | 1/2010 | Yu |
| 7,647,411 B1 | 1/2010 | Schiavone |
| 7,854,007 B2 | 12/2010 | Sprosts |
| 2003/0004716 A1 | 1/2003 | Haigh |
| 2003/0033288 A1 | 2/2003 | Shanahan |
| 2003/0061200 A1 | 3/2003 | Hubert |
| 2003/0061201 A1 | 3/2003 | Grefenstette |
| 2003/0069877 A1 | 4/2003 | Grefenstette |
| 2003/0097252 A1 | 5/2003 | Mackie |
| 2004/0059564 A1 | 3/2004 | Zhou |
| 2004/0059718 A1 | 3/2004 | Zhou |
| 2004/0059730 A1 | 3/2004 | Zhou |
| 2005/0080860 A1 | 4/2005 | Daniell |
| 2005/0223326 A1* | 10/2005 | Chang .................. G06Q 10/107 715/257 |
| 2005/0273318 A1 | 12/2005 | Zhou |
| 2005/0273336 A1 | 12/2005 | Chang |
| 2006/0004563 A1 | 1/2006 | Campbell |
| 2006/0095521 A1 | 5/2006 | Patinkin |
| 2006/0095524 A1* | 5/2006 | Kay ...................... G06Q 10/107 709/206 |
| 2006/0277044 A1* | 12/2006 | McKay .................. G10L 13/00 704/260 |

\* cited by examiner

100

110  Well Formed: The cat jumps the lazy dog.

120  Incorrect Grammar: The cat jump the lazy dog.
125

130  Incorrect Spelling: The cat jmp over the lazy dog.
135

140  Not Well Formed: The cat jumping the lazy dog.
145

Figure 1 (Prior Art)

Guidance Filter Database

| Token 210 | Frequency 220 | Portion 1 230 | ... | Portion n 240 |
|---|---|---|---|---|
| HASH("cat","jmp") | 0 | NULL | | NULL |
| HASH("cat","jump") | 1205 | cat | | jump |
| HASH("cat","jumps") | 1138 | cat | | jumps |
| HASH("cat","jumped") | 1187 | cat | | jumped |
| HASH("cat","jumping") | 12 | cat | ... | jumping |
| HASH("jumping","the") | 543 | jumping | | the |
| HASH("jumping","dog") | 324 | jumping | | dog |
| HASH("jumped","the") | 1346 | jumped | | the |
| HASH("jumped","dog") | 1187 | jumped | | dog |

Figure 2

310 — Well Formed: The cat jumps the lazy dog.

320 — Incorrect Grammar: The cat jump the lazy dog.
325

330 — Incorrect Spelling: The cat jmp over the lazy dog.
335

340 — Not Well Formed: The cat jumping th
345

| Alternatives | Frequency |
| --- | --- |
| cat jumps | 1187 |
| cat jumped | 1137 |

355

Figure 3

METHODS OF OFFERING GUIDANCE ON COMMON LANGUAGE USAGE UTILIZING A HASHING FUNCTION CONSISTING OF A HASH TRIPLET

This application is a continuation of and claims priority to U.S. patent application Ser. No. 11/745,306 filed May 7, 2007 and U.S. provisional application Ser. No. 60/798,956 filed May, 8, 2006. These and all other extraneous materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is linguistics and speech processing.

BACKGROUND OF THE INVENTION

Most usable word processing applications incorporate some form of automatic spelling or grammar checking systems to aid an individual when editing a document. For example, Microsoft® Word® indicates that words are misspelled by underlining the word in a red line or indicates that a phrase is grammatically incorrect by underlining the phrase in a green line. The individual clicks on the word to gain insight on alternative approaches to spelling or grammar. By selecting one of the alternatives, the individual can edit the document to improve the document's readability.

Unfortunately, spelling or grammar checking systems are lacking in capability, especially when migrating the checking system from one language to another. For example, an English document checker is completely useless for Japanese due to the differences in grammar, alphabets, or character representation. Furthermore, many spelling or grammar checking systems do not find subtle errors. Nor do they find words having uncommon spelling or uncommon phrasing practices that would be considered outside common usage.

Consider the following properly formed sentence: "The engineer walked into the lab." Someone who works in an engineering group might accidentally write the sentence as follows: "The engineering walked into the lab." Notice the accidental "ing" added on the end of the word "engineer." Microsoft Word's spelling or grammar checker does not catch this problem (at the time of writing this document) because the word "engineering" could be a noun and; therefore, could be the subject of the sentence. Although the sentence could be as intended, it is unlikely to be correct because the construction of the phrase is particularly unusual with respect to common usage.

As used in this application, the term "common language" refers not to similarities of one language with another, but to similarities in usage of languages. With that distinction in mind, the current inventors have appreciated that methods are needed that can identify similarities in usages in any language, i.e. in an language independent fashion.

Previously, methods include the use of rule-based systems that attempt to incorporate knowledge of semantics, syntax, or extensive databases comprising correct forms of words. The following patent applications, for example, reference using natural language rules to aid document users in editing documents:

20060004563; 20050273336; 20050273318; 20040059730; 20040059718; 20040059564; 20030097252; 20030069877; 20030061201; 20030061200; 20030004716; 20030033288

Similarly, the following issued patents reference using natural language rules to aid individuals editing documents:

U.S. Pat. Nos. 6,928,425; 6,820,075; 6,778,979; 6,658,627; 5,995,920; 5,666,442; 4,914,590

While these references address their respective problems adequately, they do not fully cover the capabilities desired by individuals editing documents. Natural language processing has been around for many years and focuses on employing the "rules" of the natural language so a software program can help the individual identify potential problems within their documents.

U.S. Patent application number 20030033288 and its corresponding U.S. Pat. No. 6,820,075 offer auto complete capabilities to users based on surrounding text within the document. Contextual information surrounding a document fragment forms the basis for a query into a database. The database returns candidates for completing the fragment or for correcting errors. However, these references and the others listed above do not teach how to provide guidance on the usage of a common language in a language independent manner through a statistical approach.

A publication accepted at the 2006 Society for Industrial and Applied Mathematics (SIAM) Conference on Data Mining on Apr. 20 to 22, 2006, titled "Using Compression to Identify Classes of Inauthentic Texts" authored by M. Dalkilic, W. Clark, J. Costello, and P. Radivojac teaches a method for using compression algorithms to indicate if documents have characteristics of authentic documents written by humans. Although the paper offers several insights into statistic document analysis, the paper does not teach, suggest, or motive using a guidance filter to offer insight into creating a document that conforms to a common language.

Thus, there remains a considerable need for methods or apparatus that guide an individual on the usage of a common language.

SUMMARY OF THE INVENTION

In the present invention, systems and methods provide guidance on the usage of language within a document. Contemplated methods include creating a guidance filter associated with the common language in ways that are at least partially language independent. Such a guidance filter could, for example, include a database comprising tokens relating to portions of the document. The tokens can include hash values associated with the portion of the document or neighboring portions.

Analyzed portions can be rather short, such as a word, a phrase, or a sentence, or can encompass an entire document or group of documents.

In preferred embodiments the document or portion passes through the guidance filter; possibly through a software program on a computer, in real-time as the document is being edited or after the document has been edited. A user of the document can thereby gain insight into how well the document conforms to the common or accepted usage by receiving an indication of conformity. In some embodiments, the user sees a highlighted word indicating that word might not conform to the usage. In other embodiments, the user is offered a drop-down list that indicates alternative portions. Further embodiments include email filters that include guidance filters to determine the probability an email comes from a source or to determine the probability an email is undesirable.

Alternative embodiment includes a computer readable memory that comprises a set of instructions for execution on a computer to offer a well-formedness guidance filter. The filter includes a database associated with a common language and has a statistical metric representing the usage of a portion of a document within the common language.

More generically, an additional embodiment includes a database comprising statistical information relating to how often a token representing a piece of data appears in a dataset. The token represents a sequence of information from set of data. For example, a set of data includes documents representing a Microsoft Word document, stock price information, music, gene sequences, or other data represented in a fashion that can be tokenized.

A Word document simply represents a string of words, white space, punctuation, formatting codes, or other information. Stock prices can be considered a series of dollar amounts over time. Music represents a sequence of notes, tones, chords, measures, or other musical parameters. Therefore, one can consider the inventive subject matter to include applications involving documents associated with stock prices, email, music, or other data that can be tokenized.

Glossary

The following descriptions refer to terms used within this document. The terms are provided to enhance clarity when discussing the various aspects of the invention matter without implied limitations.

The term "common language" means any human understandable structured communication means from which statistics can be derived. For example, common languages include English, Japanese, Spanish, or other spoken languages. Within the context of this document, common language also includes sign language, Braille, or even computer languages used for programming. Common languages also include natural languages because there are many documents from which statistics can be generated that employ natural languages throughout the world. It is contemplated, that the inventive subject matter could be extended beyond common language usage into other markets including video editing, audio editing, or editing other forms of documents. A common language falls within the group of data sets having a linear structure. Other linear structures include music, stock price data, or other data sets that have elements following each other. It is also contemplated that one could apply the disclosed techniques to more than one dimension, a photograph for example.

The term "guidance filter" means a filtering mechanism based on the usage of the common language. In preferred embodiments, the guidance filter comprises a statistical accumulation of information rather than a just a rule based accumulation of information about the common media. It is contemplated the guidance filter can be used in conjunction with a rules bases checker to enhance the offering of both systems.

The term "token" means an abstraction that represents a piece of data. Tokens can be the piece of data itself; however, more commonly a token is simply a short hand for representing the data which can be used to access statistical information in a database. For example, a hash of a sequence of data could represent a token. Tokens can be represented by a function that has the piece of data as an input and the token is the output of the function. Tokens can also comprise other tokens. Tokens will be described more fully in a later section of the document.

The teachings herein may be advantageously employed by developers of document editing or viewing packages. Guidance filters may be employed by document editors to gain insight into how well their documents conform to a usage of a common language.

Various objects, features, aspects, and advantages of the present invention will become more apparent from the following detailed description of the preferred embodiments of the invention, along with the accompanying drawings in which like numerals represent like components.

BRIEF DESCRIPTION OF THE DRAWING

FIG. 1 represents an example of how prior art document checkers provide an indication that there is a potential problem with a portion of a document.

FIG. 2 presents an example embodiment of a guidance filter that uses tokens as an index into a database.

FIG. 3 illustrates an example embodiment of offering an individual an indication of how well a document conforms to the common language.

Various objects, features, aspects and advantages of the present invention will become more apparent from the following detailed description of preferred embodiments of the invention, along with the accompanying drawings in which like numerals represent like components.

DETAILED DESCRIPTION

The following detailed description of the inventive subject matter uses several example embodiments to convey concepts presented in an understandable manner. However, the scope of the inventive subject matter is not limited to the examples, but rather should be interpreted to the broadest extent. For example, English is used as the common language example; however, the concepts presented can be applied generally to other common languages.

Overview

FIG. 1 represents an example of how prior art document checkers provide an indication of a potential problem with a portion of a document. Document 100 comprises four sentences that include well formed sentence 110, incorrect grammar sentence 120, incorrect spelling sentence 130, and not well formed sentence 140. These sentences were placed in a Microsoft Word document with active document checking. Sentence 110 is well formed and does not trigger the document checker. However, sentence 120 does trigger the document checker because of subject-verb agreement as indicated by portion 125 having the noun-verb phrase "cat jump." In addition sentence 130 also triggers the document checker because portion 135 is misspelled, "jmp" as opposed to "jump." Sentence 140 does not trigger the document filter even though it is not well formed. The document checker should find a problem with portion 145, the word "jumping" because sentence 140 is not well formed. The document checker does not trigger because sentence 140 passes through all of its rules. One would find it desirable to have a document checking system that also identifies problems associated with well-formedness that can bridge languages.

Guidance Filter: Introduction

A guidance filter, in a preferred embodiment, comprises software that uses statistics compiled over a set of documents to provide a user insight into how their document conforms to the statistics. For example, the problems associated with sentence 140 can be identified a through a guidance filter. The guidance filter compares portion 145 against how other documents use portion 145 in similar circumstances. For example, portion 145, the word "jumping," is related to the word "cat" and the words "the," "lazy," or "dog" in sentence 140. Word pairs ("cat", "jumping"), ("jumping", "the"), ("jumping", "lazy"), ("jumping", "dog") can be formed and checked against the usage of similar pairs in other documents. If the guidance filter indicates that the pair ("cat", "jumping") is found to have low occurrence, the guidance filter might find that the pair ("cat", "jumped") or ("cat", "jumps") have a higher frequency occurrence. Consequently, an indication can be provided to an individual writing sentence 140 of a potential better construction associated with portion 145. Therefore, the guidance filter offers and indication of the well-formedness of the document. Using word pairs is useful; however, one should appreciate that raw words are language dependent; consequently, a more useful approach employs an abstraction of the words in a manner that is language independent. Obviously this example is extremely simplified and those skilled in the art of document checkers will recognize there are more sophisticated variations possible, all within the scope of the concepts presented.

Guidance Filter: Tokens

A preferred embodiment of the guidance filter comprises a database of tokens. Tokens represent an abstraction of a piece of data. In other words, portions of a document can be represented by a token rather than by the portion of the document itself. For example, the token of the word "cat" could be any variable, value, structure, symbol, hash value, or other function of the word "cat." Ideally the token of the portion of the document should have some level of uniqueness associated with it. For example, the token of the word "cat" could be any of the following:

[WORD1]: Simply a sequence of symbols representing the first word in a database that could be the word "cat."
cat: The string of characters representing the word itself encoded in ASCII, UNICODE, or other encoding schemes.
MD5("cat"): An MD5 hash function of the word "cat."

Each of these example "codes" can be used to represent the word "cat" in a manner that is essentially unique. For the purposes of this document, a token of one or more objects is represented by the following:

TOKEN(object1, . . . , objectN)

where each object could be a string, another token, a number, or other item that has utility within the guidance filter. Example objects include tokens that represent white space in a document, punctuation, rule information, part of speech, relative position within a document, or other information relating to the common language. All objects are contemplated because the purpose of the tokens is to encode statistical information in a language independent manner for the common language; consequently, the objects encode the desirable characteristics of the guidance filter. This implies that the creator of the guidance filter can create a wealth of information about the statistics of the common language that can be data mined or brought to bear when comparing other documents to the common language.

In a preferred embodiment, the tokens are associated with the portions of a document where the portion can comprise a character, word, groups of words, rules, phrase or phrases, sentence, paragraph, or other grouping of information. It is contemplated that the concepts presented herein could be extended to other related document portions including compilations of many documents, document metadata, white space usage, formatting codes, or others. A token can be either direct or indirect. A direct token has a value that comprises at least part of the portion from the document. For example, referring back to FIG. 1, portion 135 could have a direct token of:

TOKEN("jmp")="jmp"

where the token of the string of characters "jmp" is the string of characters itself. Or, in the case of portion 125, one or more tokens could be generated associated with the word "jump" as follows:

TOKEN("cat", "jump")={"cat", "jump"}
TOKEN("jump", "the")={"jump", "the"}
TOKEN("jump", "dog")={"jump", "dog"}

In these example tokens associated with portion 125, the word "jump," are simply represented by a set of character strings themselves. Furthermore, the use of word stemming can be used to create direct tokens where, for example, tokens TOKEN("jump") is similar to the TOKEN("jumping") because they have the same stem "jump." These examples show that a single token can be used to represent multiple portions of a document. One should note that a string including "cat" or "jump" are just values binary encoded in a computer memory. As far as a database of statistics are concerned, there are no language dependencies included in the encoded strings. This means the software used to form the database of tokens for English would work as well on another language because software forming tokens operates on the encoding in memory.

Indirect tokens are tokens that have a value derived from the portion. An example of an indirect token includes calculating a hash value from the portion. Examples of indirect tokens of portion 125 could include:

TOKEN("jump")=HASH("jump")
TOKEN("jump", "the")=HASH("jump", "the")
TOKEN("jump", "dog")=HASH("jump", "dog")

where each token has a numerical value based on a hash function. Preferred hashing functions include MD5, or SHA-1; however, all other hashes that provide statistical uniqueness are also contemplated. Even though MD5 is a broken hash, it is still acceptable because the hash value is not necessarily used for security reasons. The resulting number of bits from the hash is preferably at least 32-bits; however, other sized hashes are contemplated. It is also contemplated that direct tokens and indirect tokens can combine to form other tokens that offer value within the guidance filter.

Other types of indirect tokens are also contemplated including those that operate as a function of the portion other than hashes. Especially preferred functions include those that provide a "nearness" measure. For example, it is useful to have the two tokens TOKEN("jump") and TOKEN("jumping") close to each other to aid in searching the database of tokens. Compression functions could offer this ability including LZW compression. Compression techniques often use tokens to represents larger groups of data. Consequently a token for "jump" might be used to represent "jumping." For example:

TOKEN("jumping")={TOKEN("jump"), TOKEN("ing")} where the token value for "jumping" is close in value to the value for "jump." The continue the example, if the value of TOKEN("jump') is "A" and the value of TOKEN("ing") is "B," then TOKEN("jumping") could have a value of "AB" which, from a searching standpoint, is close to "A."

In the preceding example word pairs were used to create hashes. One skilled in the art of natural language processing will also understand other types of information can be combined to form portions of the document. Examples of other information include document metadata, punctuation, parts of speech, or phrase types. Document metadata represents data within the document relating to the document contents. An example use of parts of speech would be creating a hash based on a word and the part of speech of the following word or preceding word. For example, a token in the database could be represented by HASH("cat", [VERB]) where [VERB] is a key used within the hash to represent that the following word is a verb. It is also contemplated that the token could encode verb tense as well. In some sense, the token encodes the rules of the common language. Rules include the syntax, semantics, or other structures. All variations of generating tokens are contemplated including those that are tokens of tokens. In some embodiments the following example tokens are useful when analyzing a document:

[PUNCT]: Represents any of a series of punctuation including commas, periods, quotes, or others. In other words, the token of any punctuation mark results in a value of [PUNCT], for example TOKEN(",")==[PUNCT]. If a word is next to the punctuation mark as in this sentence, a token can be generated by TOKEN("example", [PUNCT]).

[SENT-BEGIN]: Represents that a word begins a sentence. For example, in this sentence a token can be generated by TOKEN("For",[SENT-BEGIN]).

Again, one should note the tokens [PUNCT] and [SENT-BEGIN] are simply variables representing a concept and could be any value. Clearly, there are nearly a limitless number of possible tokens that would be useful. This implies guidance filters employing the tokens can have various utility to a user depending on how the tokens are created.

One should also appreciate that tokens could also be generated for any sequence of data. It is also contemplated that tokens can be generated for stock price history, used to identify email spam, used to profile preferred musical notes sequence, or used for other data sets.

Guidance Filter: Database

FIG. 2 presents an example embodiment of a guidance filter that uses tokens as an index into a database. In this constructed example, the database comprises token index 210 into a frequency 220 with which that token is expected to occur in a common language. Entry 221 through entry 229 in database 200 indicate what the frequency of occurrence is within the common language for the hashed tokens. Entry 221 indicates that the word pair ("cat", "jmp") does not appear within the common language because the frequency of appearance is zero where other entries have higher frequency of occurrence. It is contemplated that a zero-frequency token might not be in the database; consequently, a query for the token could result in a NULL return set. Furthermore, the word pair ("cat", "jumping") at entry 225 has a relatively low frequency of occurrence; however, could still be considered viable. Database 200 can also be indexed by the portions as well as indicated by fields portion 230 through portion 240. The second method of indexing provides for the ability to find alternatives to a low frequency entry. As an example, using an index of "cat" from portion 225 would return entries 222, 223, or 224. Entry 221 is not returned because such a token would have a NULL return value because no statistics were accumulated for that token. Then the guidance filter can supply the most likely candidate for correct usage from the return set.

The reader should note the method of gaining access to acceptable alternatives can vary. In the preferred embodiment, a single information system comprising the guidance filter database also includes the alternatives. It is also contemplated that the guidance filter can be used to enhance existing document checkers or document checkers yet to be invented. Other document checking systems are expected to offer additional methods for supplying likely alternatives to the individual editing the document. A closer inspection of document analysis is provided later in this document.

When creating the database, some embodiments find it useful to prepare data sets for entry into the database. Preparation of the data sets includes scrubbing documents to ensure consistency of representation. This ensures that all tokens are essentially "neutral" with respect to each other from one document data set to another. Example scrubbing includes removing white spaces and replacing them with a token representing the type of white space, converting all upper case letters to low case letters, or other similar preparation. The preparation of the data sets depends on the type of guidance filter that is going to be created and the statistics that would be useful.

Guidance Filter: Statistics

Frequency 220 represents a preferred statistic or metric associated with the tokens used as part of the guidance filter; however, other statistics can also be employed. Examples of other statistics associated with the tokens include density, rate, variation, or others. In fact, all manner of statistics are contemplated. Density represents the number of times a portion appears within a give sub-section of a document. Rate represents the number of times a portion appears within a given unit of time. Variation represents the pattern of usage of the portion within the common language.

In the preferred embodiment, statistics of usage are built by analyzing many examples of the common language. For example, if an individual wished to create a guidance filter based on the works of William Shakespeare, the statistics could be used by running the collected works of Shakespeare through a program that collects the statistics. As the program analyzes a document, it could calculate the hash value for each portion. In one embodiment, the program calculates a triplet of hashes where the portion of the document represents a word or a word pair. The triplet includes a hash for a word, a hash for the word and its preceding word, or a hash for the word and its following word. Then, for each hash value the program increments the number of occurrences for that hash. Therefore, the database can be considered to represent a histogram of the hashes. It is contemplated that the statistics are compiled over a sufficient data set of the common language that the statistical value associated with a token comprises a value of at least 100. More preferably, the value would exceed 1000. The more data representing the common language used to generate the statistic the better. Increasing the statistics associated with each token provides greater information when comparing documents to the common language.

Guidance Filter: Language Independence

Because the database of the guidance filter embodies generic tokens and statistics, the reader should appreciate that the database can be built for any language because a token abstractly relates to any language structure. For example, a token can be created based on two kanji characters next to each other just as easily as two words. In this respect, the guidance filter can be constructed in a manner that is language independent.

Guidance Filter: Thresholds

The use of the guidance filter, in one embodiment, is governed by a threshold setting associated with the statistics. The threshold setting represents the point at which an indication should be offered to the individual using the guidance filter. When the individual types in a portion of the document, the guidance filter will be consulted. If the statistics of the filter's database indicates the usage of the portion in the common language falls above (or below) the threshold, then the individual is presented with a message.

A preferred embodiment of a guidance filter comprises software and a database. The software represents a program of instructions that execute on a computer running an operating system. In some embodiments, the software is packaged as an off the shelf product; however, it could also be included within other packages. The database can be pre-built automatically or built as necessary by an individual associated with the document. It is contemplated one could employ many different classes of databases for different reasons. An individual could employ a Shakespeare database to write documents that conform to Shakespeare's writing style, or the individual could employ a medical database to write documents for medical journals.

Thresholds also provide for a self reinforcing database. In one embodiment a community is formed where individuals submit their words to an on-line system. The system only incorporates new documents if the new documents fall within the threshold of the existing database. The database would initially be seeded by documents that conform to the desired common language.

Guidance Filter: Evolution

A preferred guidance filter comprises statistics relating to tokens. This implies that the database of statistics can be changed dynamically as desired or as necessary. For example, additional data can be added to the database to increase the coverage of the common language usage. As more data is added, the more useful the guidance filter becomes. One should also note that data can be subtracted. One could effectively "remove" a document from the common language by calculating all relevant tokens and subtracting their statistics from the database. If the guidance filter represents all the works of Shakespeare and one of the documents proves to be written by his wife, then the document can be removed by subtracting its statistics.

It is contemplated that a guidance filter could be created for various time periods. In some embodiments, multiple guidance filters are created for each time period of interest. One could create a guidance filter for each decade of the $20^{th}$ Century, and then use the guidance filter to aid in dating other documents. In this sense, using the guidance filter as a forensic tool falls within the scope of the inventive material.

Rules based document checkers are rigid. Document checkers that follow a statistical approach are more dynamic, flexible, or adaptive. Employing the enclosed techniques allows for an automatic update of the guidance filter because new statistics will cause the database to change rather than having an individual encode rules.

Document Analysis

Once a guidance filter exists, a document and its portions can be analyzed to find those portions that require attention. Simple analysis techniques were previously presented; however, a more detailed review is in order.

One should recognize the data stored in the guidance filter is a wealth of information relating to the common language that can be brought to bear against a document. In some embodiments, the guidance filter converts or stores normalized values of the statistics in a manner that indicates the probability of a token occurring in the common language. The guidance filter can capitalize on these probabilities to increase the accuracy of the guidance.

As an example consider the tokens TOKEN("cat", "jumping") and TOKEN("jumping", "dog") from document 100. In this example the article "the" and adjective "lazy", are ignored. Database 200 indicates that both these tokens occur fairly frequently and represent potentially viable text. Neither of these tokens by themselves offers a strong indication of where the problem is relative to an appropriate threshold value. However, when the probabilities of the tokens are multiplied together, their combined probability is much smaller which could result in triggering the threshold function. One should keep in mind that the database does not have knowledge of the current document, but the guidance filter does. Consequently, the guidance filter can compare the two tokens to discover that the problem in the document is likely to be with the word "jumping" rather than "cat." Effectively, the guidance filter searches the surrounding area of the portion of interest to find correlations that deviate from the threshold function.

The guidance filter, preferably, includes the ability to query the database in many ways. For example, when searching for alternatives, the guidance filter could employ regular expressions, word stemming, wild cards, or other mechanisms to find potential suggestions. Referring back to the example problem with the word "jumping," the guidance filter could search the database, or other information system, for those tokens of the form TOKEN("cat", *) and TOKEN (*, "dog"). Two results sets are returned for each query. The intersection of the result set indicates likely candidates for alternative text. Furthermore, the alternatives can be ordered by the probability of occurring in the common language. Additionally, the guidance filter could query the database using various permutations of portions to see if it can find a best fit for the set of portions currently being reviewed. This approach is beneficial when words are transposed and need to be flagged, for example, when the guidance filter encounters a split infinitive.

Document Analysis: Examining Permutations

One skilled in the art of document checkers will appreciate that using tokens and statistics offers greater ability at document analysis. In purely rules based systems, the rules more often than not have exceptions, which themselves have exceptions. However, through using statistics of the common language, a well-formed document can be created. For example, if the guidance filter encounters a problem area, the guidance filter could try querying the database of tokens through different permutations of words in the problem area to find the permutations that has the best conformance to the common language. This approach is beneficial when words are transposed, but still pass through rules based systems.

Indication of Common Language Usage

FIG. 3 illustrates an example embodiment of offering an individual an indication of how well a document conforms to the common language. Document 300 in this example is identical to document 100. Sentence 310 is well formed, sentence 320 has incorrect grammar as shown by indication 325, and sentence 330 has incorrect spelling as shown by indication 335. Finally, sentence 340 is not well formed with respect to the common language. Document 300 is passed through a common language guidance filter and the filter senses that the words "cat jumping" does not pass a threshold associated with the common language. Consequently, the individual writing the document is offered a signal via indication 345. In a preferred embodiment, the individual can click on the indication as they would with Microsoft Word indictors to display drop-down list 355. Drop-down list 355 offers the individual alternative structures that could be used in place of the portion of the document that did not pass the threshold. Preferably the list is ordered as a function of the statistical value of the alternatives. For example, the alternative that has the highest conformance to the common language is placed first in the list. It is contemplated that the user could ignore the suggestion or could select a suggestion. It is also contemplated that indication 345 could couple to the threshold settings of the guidance filter in a manner that the individual can see at a glance how far the portion deviates from the common language. For example, if indication 345 is red then the deviation could be far from the common language or if indication 345 is blue the deviation could be small.

Although the example in FIG. 3 shows drop-down list 355 and indication 345, all other forms of providing an indication of how closely the portion of the document conforms to the usage of the common language are contemplated. For example, the entire document could have one or more values where each value represents a metric that indicates conformity to the common language. Values could include a standard deviation measure or a percent value. Additionally, individual portions of the document could have their color changed based on passing the portion of the document through the guidance filter.

The indication could be offered at any time during the document's life time. Preferably, the indication is offered during real-time as the document is being edited in a similar manner as traditional document checkers operate. Alternatively, the document could be post processed. For example, if the document is in a final form, Adobe® PDF format for instance, a document viewer could show where the document lacks conformity to the common language.

Example Uses

The following examples are presented to offer the reader an idea of how the inventive subject matter could be deployed advantageously to help individuals create or use documents. In no way do the following examples place any limitations of the inventive subject matter.

In one embodiment, an individual uses a guidance filter on-line through a web browser. The user creates a document local to their computer, or on-line, and submits to the document to a service that checks the document for conformity to the common language. Examples services include translation services from one language to another, technical review of papers, or possibly a site that authenticates the document by creating a metric associated with the document. It is contemplated that an author could submit their writings to a site which builds a database that representing the writer's works. The writer then has a method for identifying his writing style. It is expected that companies such as Google™ who recently purchased WRITELY.COM would find this technology a useful, beneficial feature for their customers.

Similarly, in another embodiment, an individual wishes to securely transmit information relating to their document. In this case, rather than submitting the document, the individual could submit only the tokens associated with the database. Preferably the tokens would be a strong hash function, possibly 128-bits in length, to provide statistical uniqueness over the myriad of possible tokens that a guidance filter could employ. An astute reader will realize that the tokens are independent values which imply they can be sent to the guidance filter out of sequence thereby enhancing the security of the exchange. In other words, one token is not connected to another token. In addition, when exchanging tokens over a network, "false tokens" could be sent to a guidance filter to further mask the exchange and hide document data.

In yet another embodiment, a guidance filter is combined with existing spell checkers or grammar checkers to enhance their capabilities. It is contemplated that companies such as Microsoft would be interested in combining the disclosed matter to help individuals improve their writings. For example, those who suffer from dyslexia often transpose words or letters in a manner that traditional document checkers would miss. However, through the use of the statistical guidance filter, the dyslexic would find their problem areas. By combining existing document checkers with a guidance filter, the number of false errors could also be reduced.

A possible type of a document checker includes an email spam filter where the spam filter can determine if an email is undesirable. The spam filter including a guidance filter has several advantages. One advantage includes the ability to filter undesired email capable of making it through existing filters. For example, spammers include random, nonsensical words to bypass existing spam filters; however, the guidance filter offers the spam filter an indication that the spam is above or below a probability threshold for acceptance because the nonsensical works do not conform to a common usage. A second advantage includes determining how well an email corresponds to an author or other source of the email. The guidance filter can build a model, or a database, of a common language usage of the source by submitting emails from the indicated source for analysis. Then, the guidance filter develops the model for the email source and the guidance filter can provide the spam checker a probability that the email conforms to that source's common language usage. In this manner, a user can gain confidence that an email came from the source as indicated.

Yet another embodiment includes combining the guidance filter with voice recognition software or optical character recognition (OCR) both of which represents non-written sources for a document. Voice recognition software has difficulty in distinguishing between homonyms and knowing what the correct word form to use in a document. It is also contemplated that a physical recognition system could be used as the source of a document, for Braille documents for example. By running a document through the guidance filter, the recognition system can offer a higher degree of recognition.

Advantages

Using a guidance filter to aid individuals in ensuring their documents conform to a common language usage has several advantages. One advantage includes offering those who suffer language problems a method for identifying problem areas. As mentioned previously, dyslexics could visually see where their documents deviate from common usage.

Employing guidance filters as described opens new markets for document editing products. Guidance filters or databases can be created for various classes of documents. It is contemplated that databases could be created that offer individuals guidance on how to make their documents conform to the style of other authors. In some markets, in legal industry for example, documents must have strict structures. Individuals could submit their documents to a paid service for review or individual could purchase specialized databases.

Using hashed tokens also improves performance of communication. As indicated above, tokens can be exchanged over a network to engage a remote guidance filter. When hashed tokens have a small size (small number of bits) relative to the corresponding portion of the document, then the amount of data exchanged over the network is reduced.

Additional Considerations

The inventive subject matter has many possible applications beyond offering guidance on document editing. The following concepts represent possible alternative uses for tokenized information stored in a database of statistics:

Stock trend analysis where a database of tokenized data points from well performing stocks is built, then other stocks could be compared to see if they have the characteristics of a well performing stock Identifying music that conforms to a listener's preferred data set. A radio could build the database as a listener changes stations, then the radio could suggest which stations are playing music or other audio streams that conform to the user's preferences.

As mentioned previously guidance filters can be used to within spam filters. After delivery, a guidance filter could find those messages that conform to spam and mark them or delete them.

Publishers could create a database of works that their customers like to ensure new works fit the model. For example, new romance novels could be compared to those novels that generated the highest revenue in the past to ensure that the new novels have the same characteristics as the old novels.

Statistical methods could be employed to automatically generate alternative words lists. Word list include synonyms, thesaurus, or other lists where words have a common relationship with respect to each other.

Office document style guides could be created to ensure office documents conform to proper form.

Gene sequences could be tokenized to see if they match known structures. The source of the gene sequence document could be generated by a machine analyzing the gene sequences.

Dialects of the same language can be distinguished

The above alternative concepts can be generalized to some degree. It is contemplated that the disclosed system would be useful for other streams of information where the stream can be tokenized and analysis can be conducted on the statistics of the tokens.

Hardware

Other aspects relate to hardware associated with the inventive subject matter. It is contemplated that one could develop hardware for storing, prototyping, manufacturing, manipulating, managing, packaging, testing, physically controlling or supporting, or for other activities associated with the physical aspects of the inventive subject matter. Therefore, the inventive subject matter includes systems, methods, or apparatus for developing, producing, manufacturing, or running the hardware. In this sense, the hardware falls within the scope of the inventive subject matter.

Software

In still another aspect, it is contemplated that one could write software that would configure, simulate, or manage various aspects of the inventive subject matter and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Thus, specific compositions and methods of offering guidance on a usage of a common language have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A computing system for improving accuracy or reducing errors of a document checker by conforming a document to common usage of a language, the computing system comprising:

a display;

a non-transitory computer readable memory storing software program instructions representing a guidance filter that operates as a function of compiled statistics for a set of documents representing common usage of a language;

and a computer processor coupled with the memory that, upon execution of the instructions, is configured to:

calculate document tokens comprising a first hash calculated as a first function of a preceding word of a word in a portion of a document being edited by a user, a second hash calculated as a second function of the word, and a third hash calculated as a third function of a following word of the word;

signal via an indicator on the display that at least one of the document tokens deviates from the common usage of the language based on the compiled statistics for the document token falling above or below a threshold; and allow the user to select an alternative structure from a list where the alternative structure will be used in place of the portion and conform to the common usage of the language.

2. The system of claim 1, wherein the guidance filter comprises a statistical database of tokens related to the language.

3. The system of claim 2, wherein the database comprises a frequency with which each of the tokens appears in a dataset of the language.

4. The system of claim 2, wherein the tokens comprise hashes of words from a dataset of the language.

5. The system of claim 1, wherein the list comprises at least two alternative text candidates.

6. The system of claim 5, wherein the at least two alternative text candidates are ordered according to a probability of occurring in the language.

7. The system of claim 1, wherein the indicator comprises an underline indicator showing deviation from the common usage of the language.

8. The system of claim 7, wherein the underline indicator showing deviation from the common usage of the language is blue.

9. The system of claim 1, wherein the first, second, and third hash functions are the same hash function.

10. The system of claim 9, wherein the hash function is selected from the group consisting of: MD5 and SHA-1.

11. The system of claim 1, wherein the threshold is configured to determine likelihood that the portion is written as intended by the user.

12. The system of claim 1, wherein the first hash is calculated as the first function of the word and its immediately preceding word, the second hash is calculated as the second function of the word, and the third hash is calculated as the third function of the word and its immediately following word.

13. The system of claim 1, wherein the document comprises a word processing document.

14. The system of claim 1, wherein the document comprises at least one of the following: a web-based document, a local computer document, music, an audio document, an email, and gene sequences.

15. The system of claim 1, wherein the indicator representing a dyslexic problem.

16. The system of claim 1, wherein the portion is no longer than a sentence.

17. The system of claim 1, wherein the portion is no longer than a paragraph.

18. The system of claim 1, wherein the document tokens take into account white space in the portion.

19. The system of claim 1, wherein the document tokens take into account punctuation in the portion.

20. The system of claim 1, wherein the guidance filter is language independent.

21. The system of claim 1, wherein the memory further stores a document editing program and wherein the guidance filter is combined with the document editing program.

22. A computing system for improving accuracy or reducing errors of a document checker by conforming a document to common usage of a language, the computing system comprising:
   a display;
   a non-transitory computer readable memory storing software program instructions representing a guidance filter that operates as a function of compiled statistics for a set of documents representing common usage of a language; and
   a computer processor coupled with the memory that, upon execution of the instructions, is configured to:
      calculate document tokens comprising a first hash calculated as a first function of a preceding word of a word in a portion of a document being edited by a user, a second hash calculated as a second function of the word, and a third hash calculated as a third function of a following word of the word, wherein at least one of the first hash, the second hash, and the third hash is a hash function selected from the group consisting of: MD5 and SHA-1;
      signal via an indicator on the display that at least one of the document tokens deviates from the common usage of the language based on the compiled statistics for the document token falling above or below a threshold; and
      allow the user to select an alternative structure from a list where the alternative structure will be used in place of the portion and conform to the common usage of the language.

* * * * *